United States Patent
Vosbikian et al.

(10) Patent No.: US 8,047,495 B2
(45) Date of Patent: Nov. 1, 2011

(54) HEIGHT ADJUSTABLE CONTAINER SYSTEM

(75) Inventors: Peter S. Vosbikian, Moorestown, NJ (US); Robert Petner, Burlington, NJ (US)

(73) Assignee: Zenith Innovation, LLC, Delran, NJ (US)

( * ) Notice: Subject to any disclaimer, the term of this patent is extended or adjusted under 35 U.S.C. 154(b) by 339 days.

(21) Appl. No.: 12/381,346

(22) Filed: Mar. 11, 2009

(65) Prior Publication Data
US 2010/0230570 A1 Sep. 16, 2010

(51) Int. Cl.
*A47H 1/10* (2006.01)
(52) U.S. Cl. ........ 248/323; 248/317; 248/327; 248/333; 119/51.01
(58) Field of Classification Search .................. 248/333, 248/323, 327; 119/53, 51.01
See application file for complete search history.

(56) References Cited

U.S. PATENT DOCUMENTS

| | | | | |
|---|---|---|---|---|
| 2,591,126 A | * | 4/1952 | Breck, Jr. ...................... | 119/52.2 |
| 4,078,625 A | * | 3/1978 | Loeb .............................. | 177/233 |
| 4,289,292 A | * | 9/1981 | Kunjumon ..................... | 248/333 |
| 5,052,148 A | * | 10/1991 | Sharon et al. .................... | 47/67 |
| 5,289,796 A | * | 3/1994 | Armstrong ................... | 119/52.3 |
| 5,568,954 A | * | 10/1996 | Burgess ........................ | 292/338 |
| 7,654,225 B2 | * | 2/2010 | Madsen et al. ............... | 119/52.3 |

* cited by examiner

*Primary Examiner* — Amy J Sterling
(74) *Attorney, Agent, or Firm* — Stuart M. Goldstein

(57) ABSTRACT

A height adjustable container system which includes a container through which at least one elongated, inner supporting member extends. The supporting member is secured at one end to a mounting system consisting of a ceiling mount and corresponding U-bracket/bolt combination. In one embodiment of the invention, an elongated inner supporting member is telescopically located within an elongated outer supporting member. A spring biased press button or mechanical stop component extending from the inner supporting member allows the outer supporting member on which the container is mounted to be vertically lowered, so that when the container is used as a planter, the plants in the container can be watered and when the container is a bird feeder, bird food can be added to the feeder. By simply pushing the container upward along the supporting member, the container is again elevated and locked in its elevated, suspended position. In a second embodiment of the invention, the container is supported by a single supporting member which guides its movement vertically up and down from a suspended elevated position to a lowered position.

12 Claims, 8 Drawing Sheets

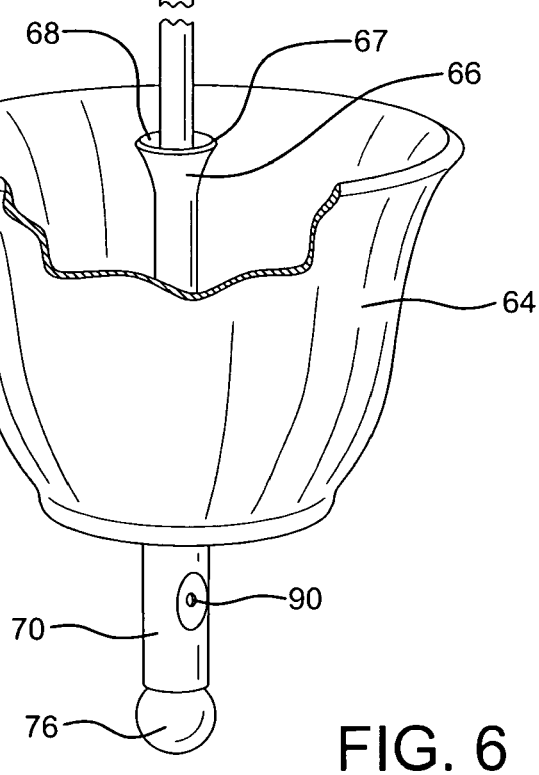
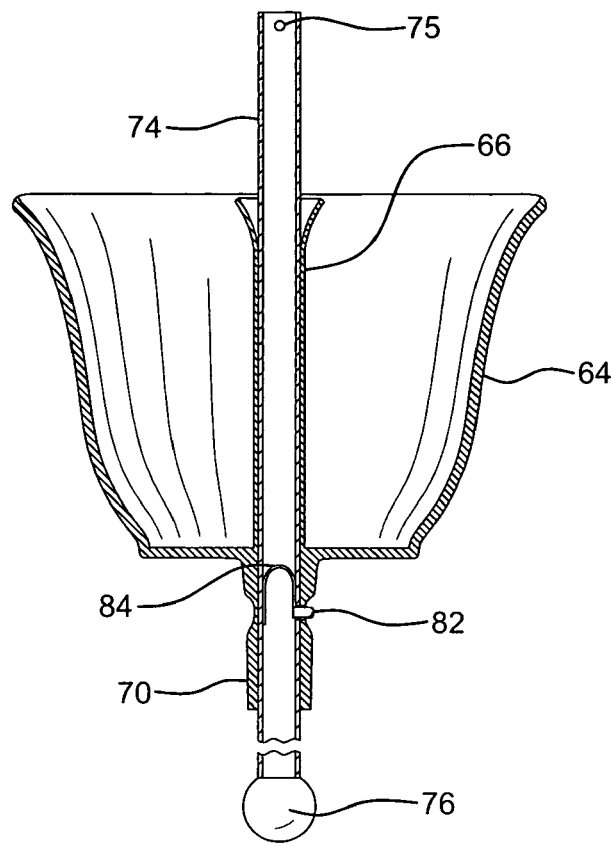
FIG. 5
FIG. 6

HEIGHT ADJUSTABLE CONTAINER SYSTEM

BACKGROUND OF THE INVENTION

Mounting decorative and functional receptacles to and suspending them from overhead surfaces is a popular and attractive way of displaying planters, bird feeders, lamps, and similar container based items. Whether mounted and hung from an indoor ceiling or outdoors from a roof overhang or a tree, suspended planters, birdfeeders and similar hanging devices provide an appealing and convenient alternative to ground base support of such items.

However, suspended containers present the obvious problem of being out of reach to the normal user who must gain access to the container, e.g. to water or attend to a plant in a suspended planter, to fill a suspended birdfeeder, or maintain a lamp. The use of a step stool to reach elevated containers, while functional, presents the normal hazards which are inherent with standing on a ladder. Moreover, when step stools are not available, the user may attempt to reach the container by alternate, unsafe means. Thus, the removal of a container to attend to its contents and then the replacement of the container in its elevated position is an inconvenient, time consuming, and potentially unsafe process.

The problems associated with suspended, container based items have been recognized by the prior art. For example, U.S. Pat. Nos. 4,187,996, 5,052,148, and 5,065,971 disclose various height adjustable planter systems. However, these and similar systems either operate by means of an inordinate number of moving parts which are susceptible to breakage, are expensive to manufacture, and therefore impractical, or they are unstable and difficult to precisely position. Most are cumbersome to operate as well.

SUMMARY OF THE INVENTION

It is thus the object of the present invention to provide a height adjustable container system which overcomes the limitations and disadvantages of prior systems.

It is the object of the present invention to provide a height adjustable container system which provides quick and easy access to a suspended planter, bird feeder, lamp component or similar container-based item.

It is another object of the present invention to provide a height adjustable container system which has a rigid suspended support element for maintaining the container precisely in the desired stationary elevated and lowered positions.

It is a further object of the present invention to provide a height adjustable container system which allows the suspended container of this system to be raised and lowered with minimal effort.

It is still another object of the present invention to provide a height adjustable container system which allows the suspended container of this system to be lowered simply by pushing a button on the inner supporting member on which the container is suspended.

It is another object of the present invention to provide a height adjustable container system which allows the suspended container of this system to be raised simply by pushing the container up along its inner supporting member.

It is a further object of the present invention to provide a height adjustable container system whose up and down operation constitutes a safe and efficient means of vertically raising and lowering the container.

It is still another object of the present invention to provide a height adjustable container system which is easy and enjoyable to operate.

It is a further object of the present invention to provide a height adjustable container system which is simply and attractively mountable to an overhead surface to maintain the container in a relative immoveable vertical position.

These and other objects are accomplished by the present invention, a height adjustable container system which comprises a container through which at least one elongated, inner supporting member extends. The supporting member is secured at one end to a mounting system consisting of a ceiling mount and corresponding U-bracket/bolt combination. In one embodiment of the invention, an elongated inner supporting member is telescopically located within an elongated outer supporting member. A spring biased press button extending from the inner supporting member allows the outer supporting member on which the container is mounted to be vertically lowered, so that when the container is used as a planter, the plants in the container can be watered and when the container is a bird feeder, bird food can be added to the feeder. By simply pushing the container upward along the supporting member, the container is again elevated and locked in its elevated, suspended position. In a second embodiment of the invention, the container is supported by a single supporting member which guides its movement vertically up and down from a suspended elevated position to a lowered position.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 5 is a cross-sectional view of the second embodiment of the height adjustable container system of the present invention with its container in the elevated position.

FIG. 6 is a perspective view of the second embodiment of the height adjustable container system of the present invention with its container in the lowered position.

DETAILED DESCRIPTION OF THE INVENTION

Figure 1:
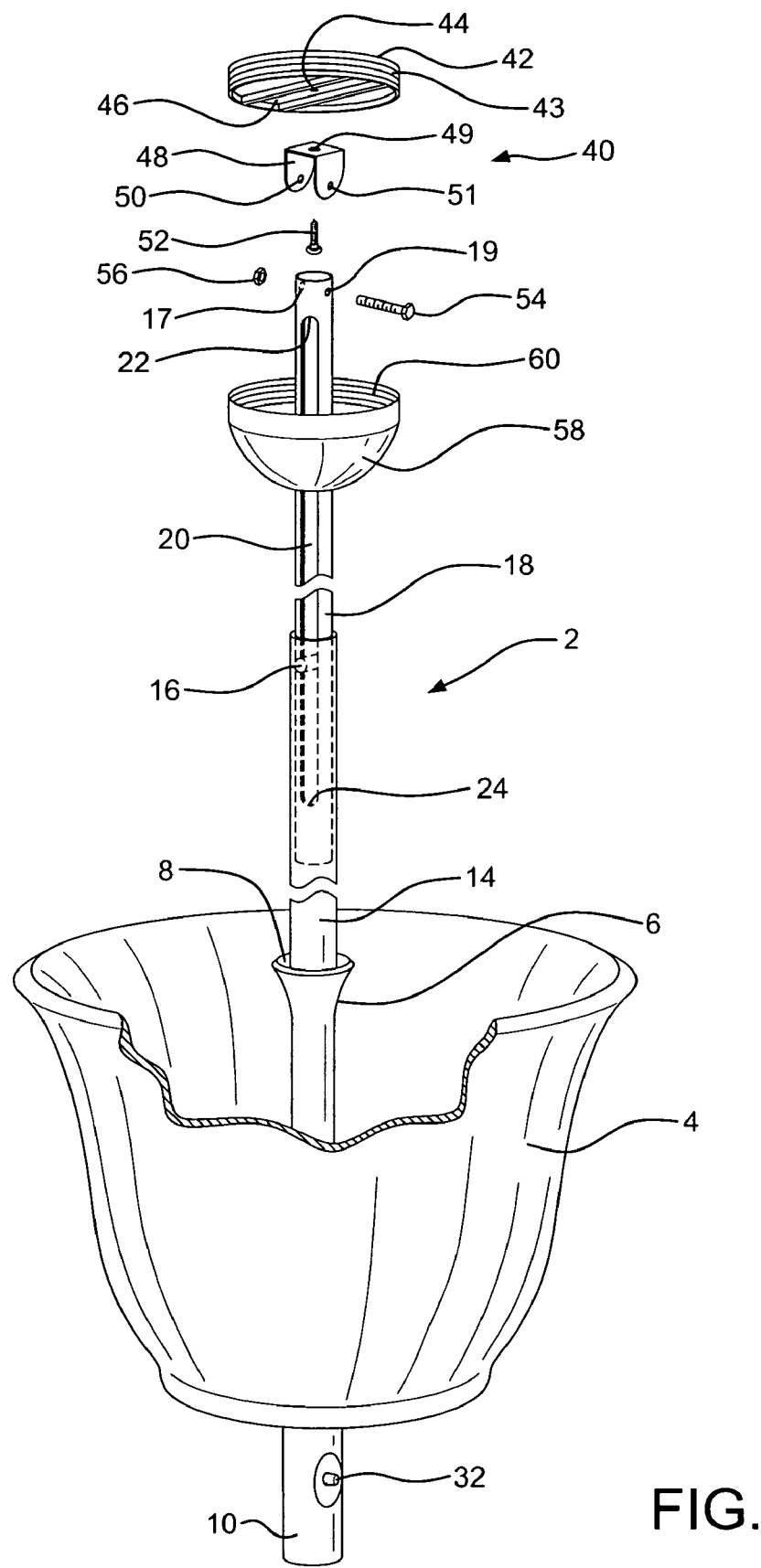
FIG. 1 is an exploded perspective view of the height adjustable container system of the present invention.

FIG. 1 shows dual telescoping height adjustable container system 2. Container 4 in this embodiment is bunt-shaped, with upstanding central tubular element 6 and center through opening 8. The shape and type of container is not to be considered so restrictive, as many different containers can be used for the various uses contemplated for the invention, e.g. for planters, bird feeders, lighting components, etc.

Hollow control handle 10 extends from container 4. Center opening 8 leads into the open space of control handle 10.

Outer supporting guide member 14 is positioned within tubular element 6 and center opening 8 of container 4. Stop element 16 extends into the interior of outer member 14. Stop element 16 can take the form of a screw, bolt, key, or similar structure.

Inner supporting guide member 18 is positioned within outer member 14. Inner member 18 comprises elongated slot or channel 20 having an upper end 22 and a lower end 24. In the alternative, a mechanical stop member, like a pin or bolt, can be inserted at the upper and lower ends of slot or channel 20. Inner member 18 is positioned within outer member 14 such that stop element 16 is slideable disposed within slot or channel 20. In this manner, outer member 14 is vertically slideable over inner member 18 from a retracted position in which stop element 16 contacts slot upper end 22 or lower mechanical stop member, wherein container 4 is in its raised position (FIG. 2), to an expanded position in which the stop element contacts lower end 24 or lower mechanical stop member, wherein the container is in its fully lowered position (FIG. 3).

Figure 4:
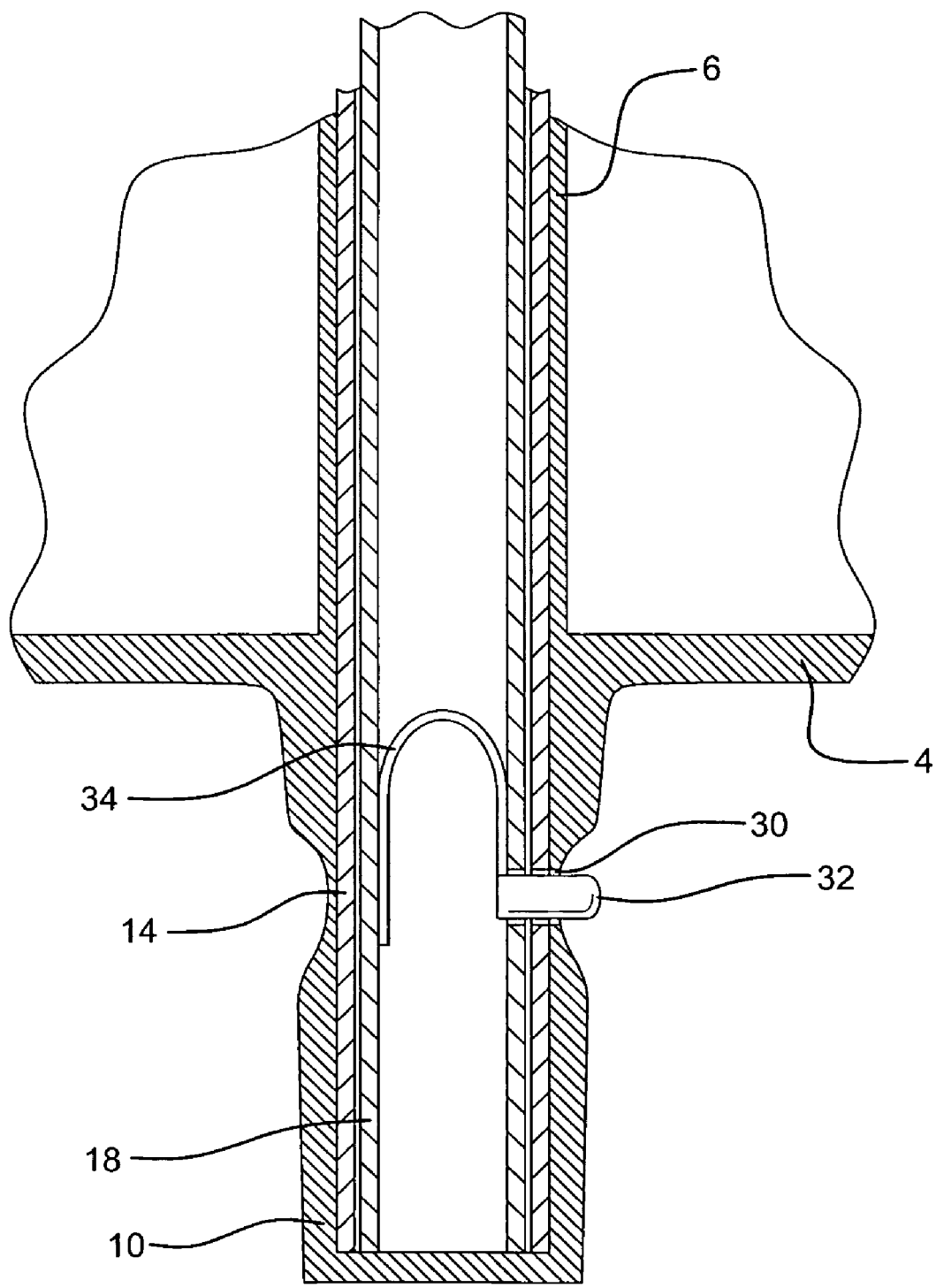
FIG. 4 is a cross-sectional view of the handle section of the height adjustable container system of the present invention when its container is in the elevated position.

As best seen in FIG. 4, control handle 10 has through hole 30 near its lower end through which push button 32 extends into or from inner member 18. Push button 32 is biased outward by spring 34 located within inner member 18. When inner member 18 is fully retracted into handle 10, that is container 4 is in the raised position, push button 32 is compelled by spring 34 through hole 30 and, acting as a stop, locks the inner member within control handle 10 in the raised position. When button 32 is pushed inward, outer member 14, compelled by gravity, is free to slide down inner member 18. Downward slideable movement of outer member 14 is halted when stop element 16 of the outer element contacts lower end 24 or lower stop member at slot or channel 20 of the inner member. In this expanded position, container 4 is lowered to allow access to a user for watering plants in the container when the system is used as a planter, or for filling the container with feed when the system is employed as a bird feeder, or tending to lighting components when a lamp is housed in the container.

To raise container 4 back to its up position, the user merely pushes container 4 up. This causes outer member 14 to slide up over inner member 18, stop element 16 of the outer member moving upwards, as well, within slot or channel 20 of the inner member. Upward movement of container 4 and outer member 14 is halted when outer member 14 is raised such that stop element 16 contacts upper end 22 or upper stop member and, at the same time, push button 32 of inner member 18 reaches hole 30 in control handle 10. When push button 32 is adjacent to through hole 30, spring 34, continually biasing the push button, compels it into through the hole before outer member 14 reaches upper end 22 or upper stop member. This assists in stopping the upward movement of outer member 14 in relation to inner member 18 and locking container 4 in place. Thus, a simple and effective means of raising and lowering container 4 of container system 2 is accomplished.

Figure 2:
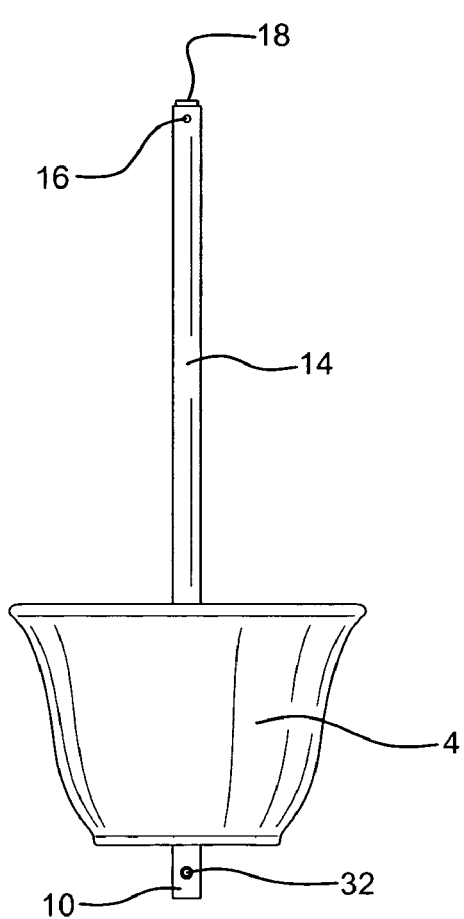
FIG. 2 is an elevation view of the height adjustable container system of the present invention with its container in the elevated position.
Figure 3:
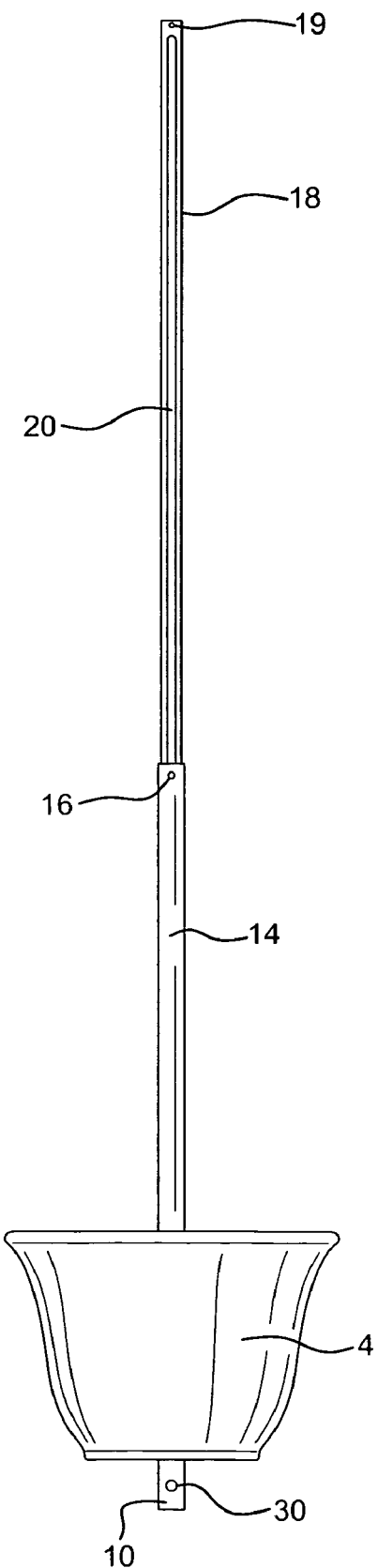
FIG. 3 is an elevation view of the height adjustable container system of the present invention with its container in the lowered position.

It is contemplated that, in lieu of the push button 32/spring 34 system described above, a mechanical component, e.g. a pin, can simply be inserted through openings in control handle 10, outer member 14, and inner member 18, to maintain these components and, hence container 4, in both the elevated position shown in FIG. 2 and the lower position shown in FIG. 3.

Height adjustable container system 2 is suspended from an overhead surface by unique mounting system 40. Mounting system 40 comprises base ceiling mount 42 comprising through hole 44 and channel 46. External threads 43 circumscribe ceiling mount 42. U-bracket 48 has holes 49, 50, and 51. U-bracket 48 is configured to be inserted into channel 46 of ceiling mount 42 and the bracket and mount are attached to the overhead surface by screw 52. Screw 52 can be secured directly to a beam or rafter in the overhead surface or connected by an anchor, toggle bolt, or other readily known attachment means. The upper end of inner member 18 comprises opposing holes 17 and 19 configured to be aligned with openings 50 and 51 of U-bracket 48. Bolt 54 is inserted into holes 19, 51, 50, and 17 and secured in place by nut 56. Cover 58, positioned around inner member 18, is then slid up the inner member and threads 60 of the cover are threadably engaged with outer threads 43 of ceiling mount 42 to complete mounting system 40.

FIGS. 5-9 show a second embodiment of the invention which comprises container 64 with central tubular element 66 and center through opening 68. Hollow control handle 70 extends from container 64. Hollow control handle 70 is opened at its bottom 73. Supporting guide member 74 extends through container 64 and its tubular element 66 and opening 68, and completely through control handle 70. Member 74 comprises a ball stop or similar expanded end stop 76 at its very end. Member 74 also comprises push button 82 biased by spring 84 through opening 90 in control handle 70. The system is suspended from an overhead surface by mounting system 40, as previously described with regard to the first embodiment. In this case, member 74 is secured to ceiling mount 42 and bracket 48 connected by screw 52, via holes e.g. 75 in the upper end of the tubular member corresponding to holes 17 and 19 through which bolt 54, secured by nut 56, extends, as described with regard to the previous embodiment.

Figure 7:
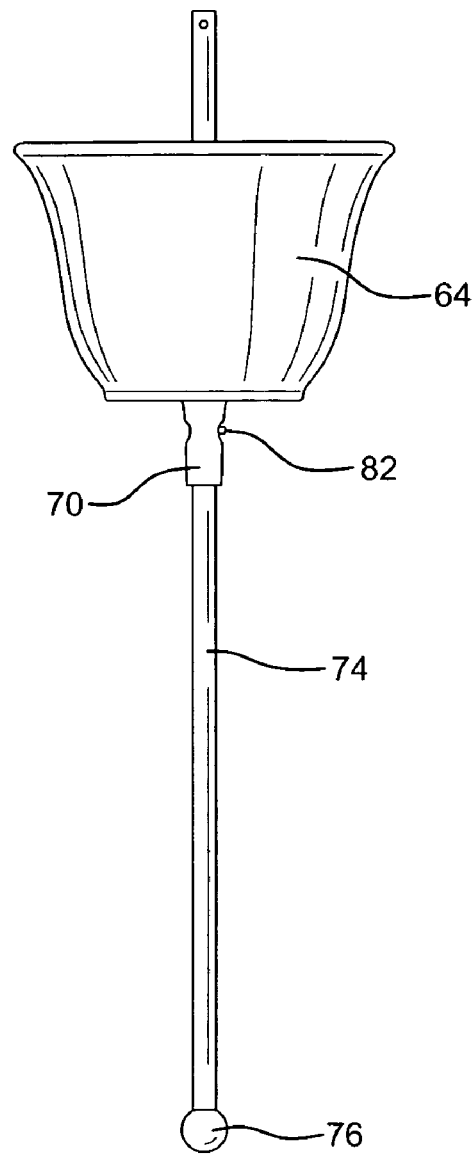
FIG. 7 is a elevation view of the second embodiment of the height adjustable container system of the present invention with its container in the elevated position.
Figure 8:
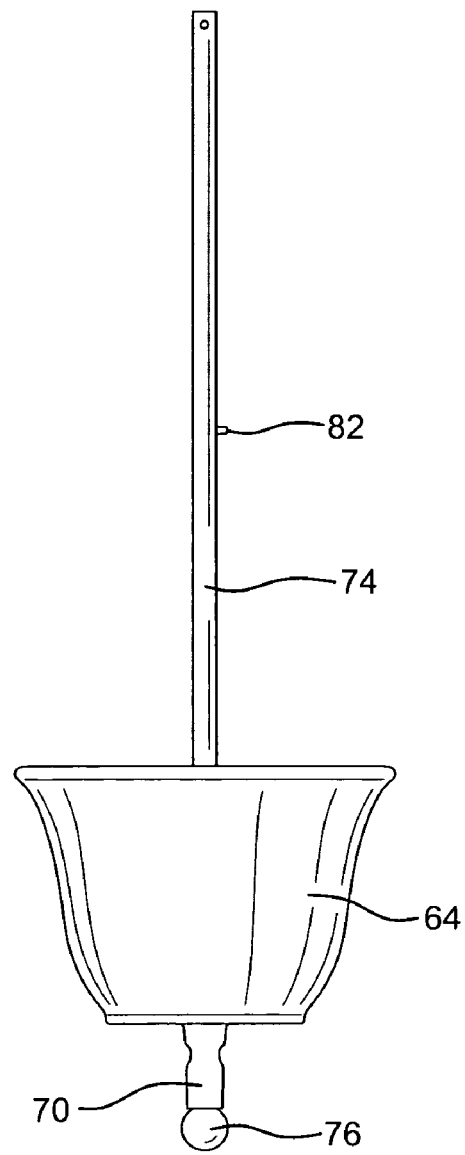
FIG. 8 is an elevation view of the height adjustable container system of the present invention with its container in the lowered position.
Figure 9:
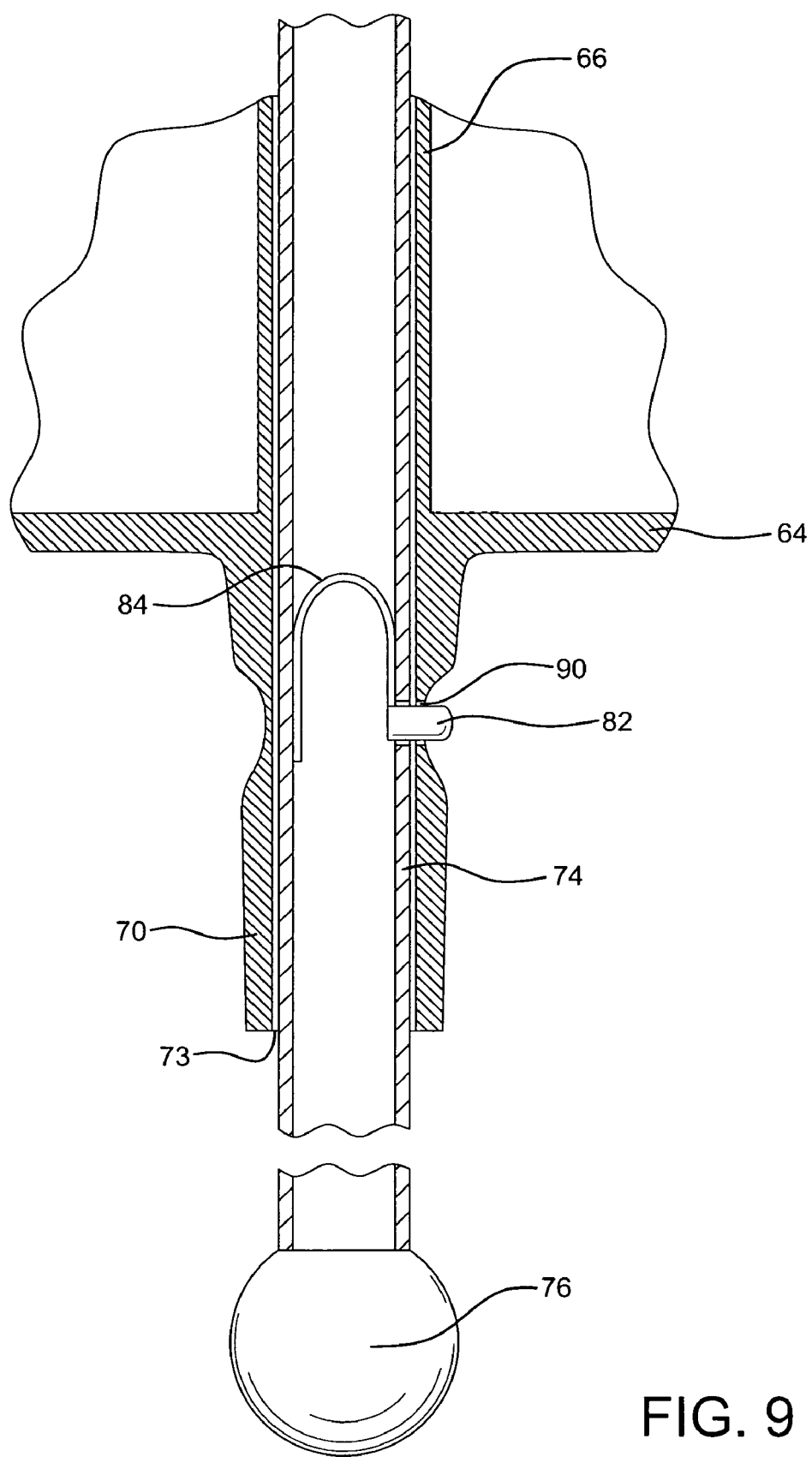
FIG. 9 is a cross-sectional view of the handle section of the second embodiment of the height adjustable container system of the present invention with its container in the elevated position.

As shown in FIGS. 5 and 7, container 64 is maintained in its fully raised or elevated position by push button 82, compelled outward of control handle 70 by spring 84 through opening 90 in the control handle. When button 82 is pushed inward of control handle 70, the force of gravity slides container 64 downward along member 74 until the control handle contacts stop 76, in its fully lowered position, as shown in FIGS. 6 and 8. To return container 64 to its raised position, the container is simply pushed up member 74 until button 82 is again compelled through opening 90 in control handle 70. Upper section 67 of tubular element 66 is tapered slightly to facilitate its movement, as it is being slid upward on member 74, over button 82.

As described with regard to the previous embodiment, rather than using the push button 82/spring 84 system, a mechanical component, e.g. a pin, can be inserted through openings in control handle 70 and member 74 to maintain these components, and hence container 64, in the elevated position shown in FIGS. 5 and 7.

Figure 10:
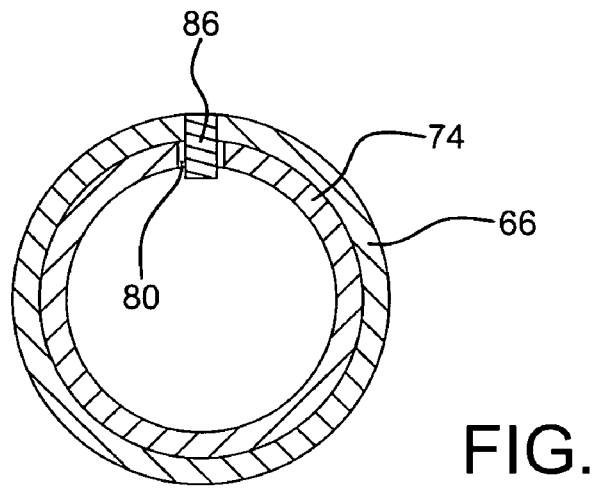
FIG. 10 is a cross-section of the inner and outer supporting members of the present invention in the second embodiment showing one manner of alignment of the components.

Vertical alignment of push button 82 within opening 90 in control handle 70 can be maintained with a slot system, as described with regard to the first embodiment 1. That is member 74 can comprise an elongated slot or channel 80 with upper and lower ends or mechanical stop members and a stop element 86 extending into the interior of tubular element 66, for example as shown in FIG. 10, the stop element acting as a guide within the slot to maintain the tubular member and tubular element in vertical alignment.

Figure 11:
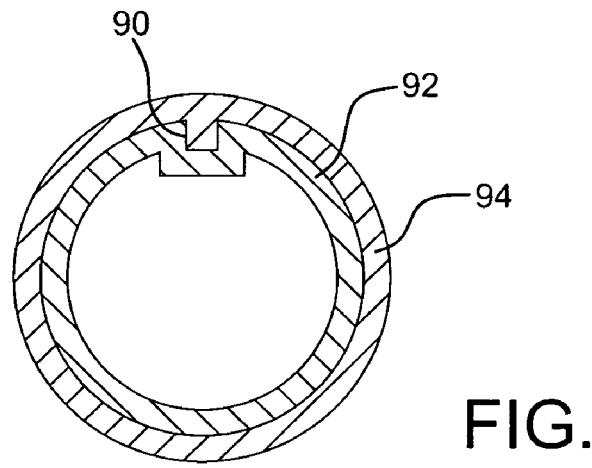
FIG. 11 is a cross-section of the inner and outer supporting members of the present invention showing another manner of alignment of the components.
Figure 12:
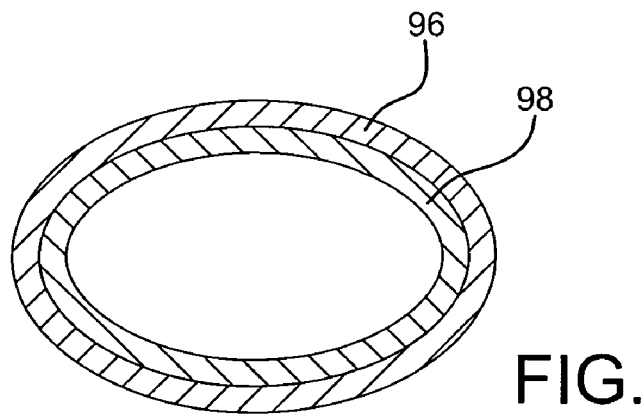
FIG. 12 is a cross-section of the inner and outer supporting members of the present invention showing another manner of alignment of the components.
Figure 13:
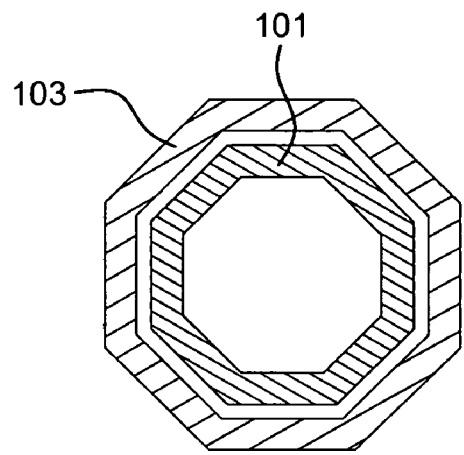
FIG. 13 is a cross-section of inner and outer supporting members of the present invention showing another manner of alignment of the components.
Figure 14:
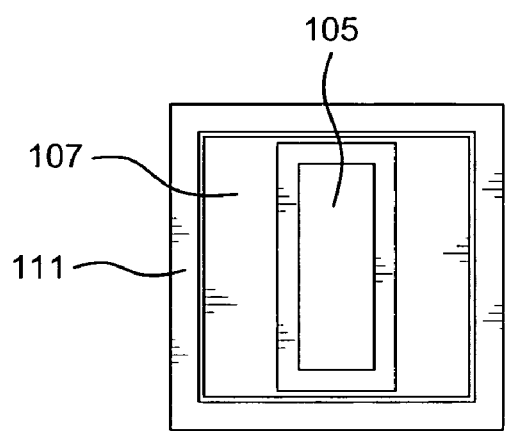
FIG. 14 is a cross-section of inner and outer supporting members of the present invention showing another manner of alignment of the components.
Figure 15:
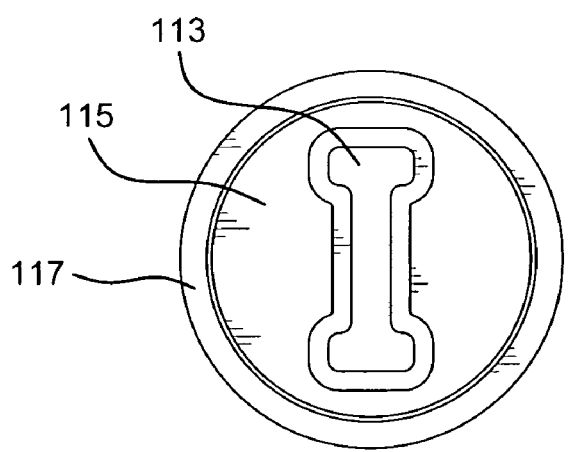
FIG. 15 is a cross-section of inner and outer supporting members of the present invention showing another manner of alignment of the components.

Vertical alignment between outer supporting member 14 and inner supporting member 18 in the first embodiment, and tubular element 16 and supporting member 74 in the second embodiment can also be maintained by use of a keyway configuration 90 between the inner and outer components 92 and 94 in FIG. 11. Other means of maintaining vertical alignment include shaping the inner and outer components in any number of congruent, polygonal configurations, e.g. oval shaped components 96 and 98 in FIG. 12, or octagonal components 101 and 103 shown in FIG. 13. Flat bar member 105 positioned in insert 107 within square shaped outer component 111, see FIG. 14, will also be effective to maintain vertical alignment. FIG. 15 shows the use of I bar member 113 positioned within insert 115 in round outer component 117. While a number of means of maintaining vertical alignment have been disclosed, the invention should not be considered so restricted. Equivalent vertical alignment means are considered to be within the scope of the invention.

Although the suspended supporting guide members described in the embodiments herein are rigid elements on which containers 4 and 64 are raised and lowered, it is contemplated that supporting guide members can take other forms. For instance, and with specific reference to the embodiments shown in FIGS. 7 and 8, chains with links of various different configurations can be used in lieu of rigid member 74, and be hung overhead by mounting system 40, previously described. High strength cable or woven rope can also be used. For each such format, appropriate releasable stop means located on the guide member would be employed to maintain supported container 64 in its elevated position.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A height adjustable container system comprising:
  a container having a center opening extending therethrough;
  elongated, vertically positioned container guide means comprising an internal space traversing its entire length, the guide means extending through the center opening and supporting the container for up and down vertical movement thereon;
  mounting means to hang the guide means from an overhead surface, whereby the guide means and container are suspended from the overhead surface solely by the mounting means;
  control means freely and adjustably moveable within the internal space of the guide means for maintaining the guide means in a stationary position within the container and for adjusting the up and down vertical position of the container on the guide means; and
  a control handle extending from the bottom of the container, such that upon movement of the control means within the internal space, the guide means is slideably and vertically moveable in relation to and within the control handle and wherein the guide means extends completely through the control handle to a stop means located at the lower end of the guide means for halting the downward vertical movement of the container on the guide means.

2. The height adjustable container system as in claim 1 wherein the guide means comprises a supporting member extending through the center opening and out of the bottom of the container.

3. The height adjustable container system as in claim 2 wherein the control means extends from the supporting member.

4. The height adjustable container system as in claim 1 wherein the control means comprises push button means extending into the guide means, said push button means being biased outward by a spring located within the internal space, whereby by engaging the push button means, said push button means acts against the spring to permit the container to move vertically up and down on the guide means.

5. The height adjustable container system as in claim 1 wherein the control means comprises a stop element extending into the guide means to maintain the vertical position of the container on the guide means.

6. The height adjustable container system as in claim 1 wherein the center opening comprises an elongated channel extending from the bottom of the container through which the guide means is vertically moveable.

7. The height adjustable container system as in claim 1 wherein the container comprises a tubular element upstanding from the center of the container.

8. The height adjustable container system as in claim 1 wherein the mounting means comprises bracket means for maintaining the guide means suspended from the overhead surface and base support means secured to the overhead surface for receiving the bracket means.

9. A height adjustable container system comprising:
  a container having a center opening extending therethrough;
  at least one vertically positioned elongated member comprising an internal space traversing its entire length, the elongated member extending through the center opening, the container being supported by said elongated member in a plurality of vertical positions on the member;
  mounting means to hang the elongated member from an overhead surface, whereby the member and the container are suspended from the overhead surface solely by the mounting means;
  control means freely and adjustably mounted within the internal space of the elongated member for maintaining the elongated member in a stationary position within the container and for adjusting the up and down vertical position of the container on the member; and a control handle extending down from the container such that upon movement of the control means within the internal space, the elongated member is slideably and vertically moveable in relation to and within the control handle and wherein the elongated member extends completely through the handle to a stop means located at the lower end of said elongated member for halting the downward vertical movement of the container on the member.

10. The height adjustable container system as in claim 9 wherein the container comprises a tubular element upstanding from the center of the container.

11. The height adjustable container system as in claim 9 wherein the mounting means comprises bracket means for maintaining the elongated member suspended from the overhead surface and base support means secured to the overhead surface for receiving the bracket means.

12. A height adjustable container system comprising:
a container having a center opening therethrough;
at least one vertically positioned elongated member extending through the center opening, the elongated member having a lower end, the container being supported by said elongated member in a plurality of vertical positions on the member;

mounting means to hang the elongated member from an overhead surface, whereby the member and the container are suspended from the overhead surface solely by the mounting means;

control means located on the elongated member for adjusting the up and down vertical position of the container on the member;

a control handle extending down from the container and wherein the elongated member extends completely through the handle to the lower end of said member for halting the downward vertical movement of the container on the member, the control handle having a closed bottom surface, the lower end of the said member remaining within the control handle, above its closed bottom surface, when the container is at its highest vertical position on the member.

\* \* \* \* \*